(12) United States Patent
Bird

(10) Patent No.: US 8,978,838 B2
(45) Date of Patent: Mar. 17, 2015

(54) CONTROLLABLE OVERRUNNING COUPLING

(75) Inventor: Norman J. Bird, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 266 days.

(21) Appl. No.: 13/488,699

(22) Filed: Jun. 5, 2012

(65) Prior Publication Data

US 2013/0319810 A1 Dec. 5, 2013

(51) Int. Cl.
*F16D 65/16* (2006.01)
*F16D 41/12* (2006.01)

(52) U.S. Cl.
USPC .......... 188/82.7; 192/46; 192/48.2; 192/84.2; 192/84.8; 192/48.92

(58) Field of Classification Search
None
See application file for complete search history.

(56) References Cited

U.S. PATENT DOCUMENTS

| | | | | |
|---|---|---|---|---|
| 1,960,004 | A * | 5/1934 | Franz | 192/47 |
| 2,409,009 | A * | 10/1946 | Bakke | 192/46 |
| 3,893,352 | A * | 7/1975 | Cotton | 475/99 |
| 7,631,738 | B2 | 12/2009 | Smith et al. | |
| 7,766,790 | B2 | 8/2010 | Stevenson et al. | |
| 8,051,959 | B2 * | 11/2011 | Eisengruber | 188/82.3 |
| 8,087,502 | B2 | 1/2012 | Samie et al. | |
| 2004/0159517 | A1 * | 8/2004 | Thomas | 192/39 |
| 2008/0156596 | A1 | 7/2008 | Smith et al. | |
| 2011/0290608 | A1 | 12/2011 | Bird et al. | |
| 2012/0103747 | A1 | 5/2012 | Bird | |

* cited by examiner

*Primary Examiner* — Ramya Burgess
*Assistant Examiner* — Mark Manley
(74) *Attorney, Agent, or Firm* — James Dottavio; MacMillan, Sobanski & Todd, LLC

(57) ABSTRACT

A drive device includes a first one-way coupling including a cam plate, pocket plate and struts, a second one-way coupling including a second cam plate driveably connected to the pocket plate, second pocket plate extending in a partial circular arc and secured to the cam plate, and second struts for opening and closing a drive connection between said second plates, and electromagnets for causing the second struts to close said drive connection.

17 Claims, 4 Drawing Sheets

CONTROLLABLE OVERRUNNING COUPLING

BACKGROUND OF THE INVENTION

1. Field of the Invention

This invention relates generally to an overrunning, one-way drive device, such as a brake or clutch, whose engaged and disengaged states are selectively controllable.

2. Description of the Prior Art

Conventionally a one-way brake (OWB) or one-way clutch requires two circular rings or raceways, because the raceway that transmits input torque contains the locking elements, such as rollers, struts, or rockers. The input race contains the struts because centrifugal forces are used to move the locking elements away from the output race, which reacts torque. The output raceway is annular, because the locking elements may stop at any location against the output raceway.

Centrifugal force is used to move the locking elements away from the output raceway to limit the duty cycle on the locking elements and springs during the overrun phase of the OWB. If centrifugal force were not employed in this way, the locking elements would wear prematurely and the spring duty cycle could cause premature failure.

The raceways should be annular to satisfy the need to distribute the mass of the rotating components evenly, thereby avoiding an objectionable amount of unbalance.

But conventional raceways for one-way clutches and brakes are expensive, heavy and require too much space.

SUMMARY OF THE INVENTION

A drive device includes a first one-way coupling including a cam plate, pocket plate and struts, a second one-way coupling including a second cam plate driveably connected to the pocket plate, second pocket plate extending in a partial circular arc and secured to the cam plate, and second struts for opening and closing a drive connection between said second plates, and electromagnets for causing the second struts to close said drive connection.

The raceways are the largest components in a one-way brake or one-way clutch, the heaviest components, and the most expensive components.

The second pocket plate has the form of a circular arc, whose includes angle is substantially less than ninety degree, large enough to contain the necessary number of struts, thereby reducing the cost and weight of the raceway and minimizing space required for it in the transmission.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
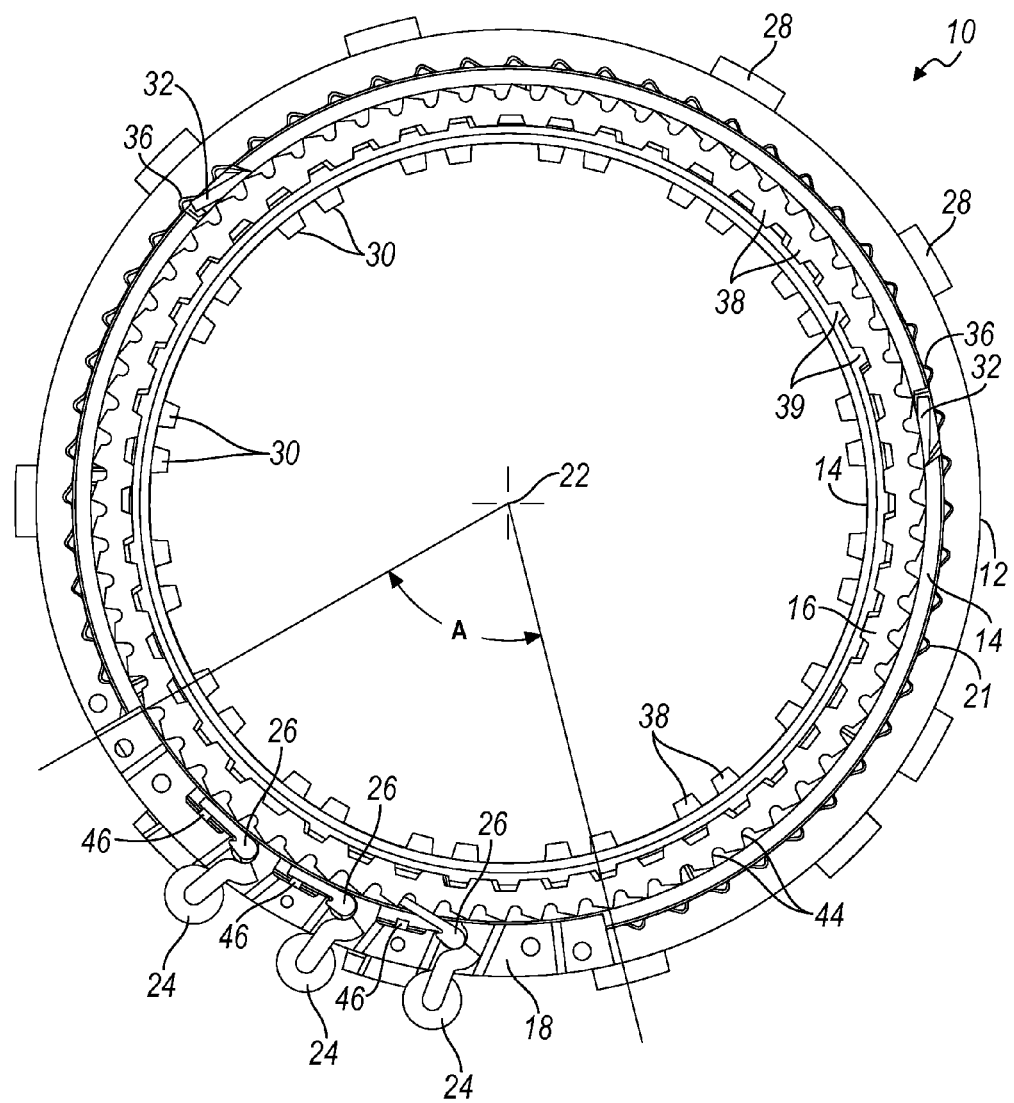
FIG. 1 is a front view of a selectable OWC in which the rings are aligned axially.
Figure 2:
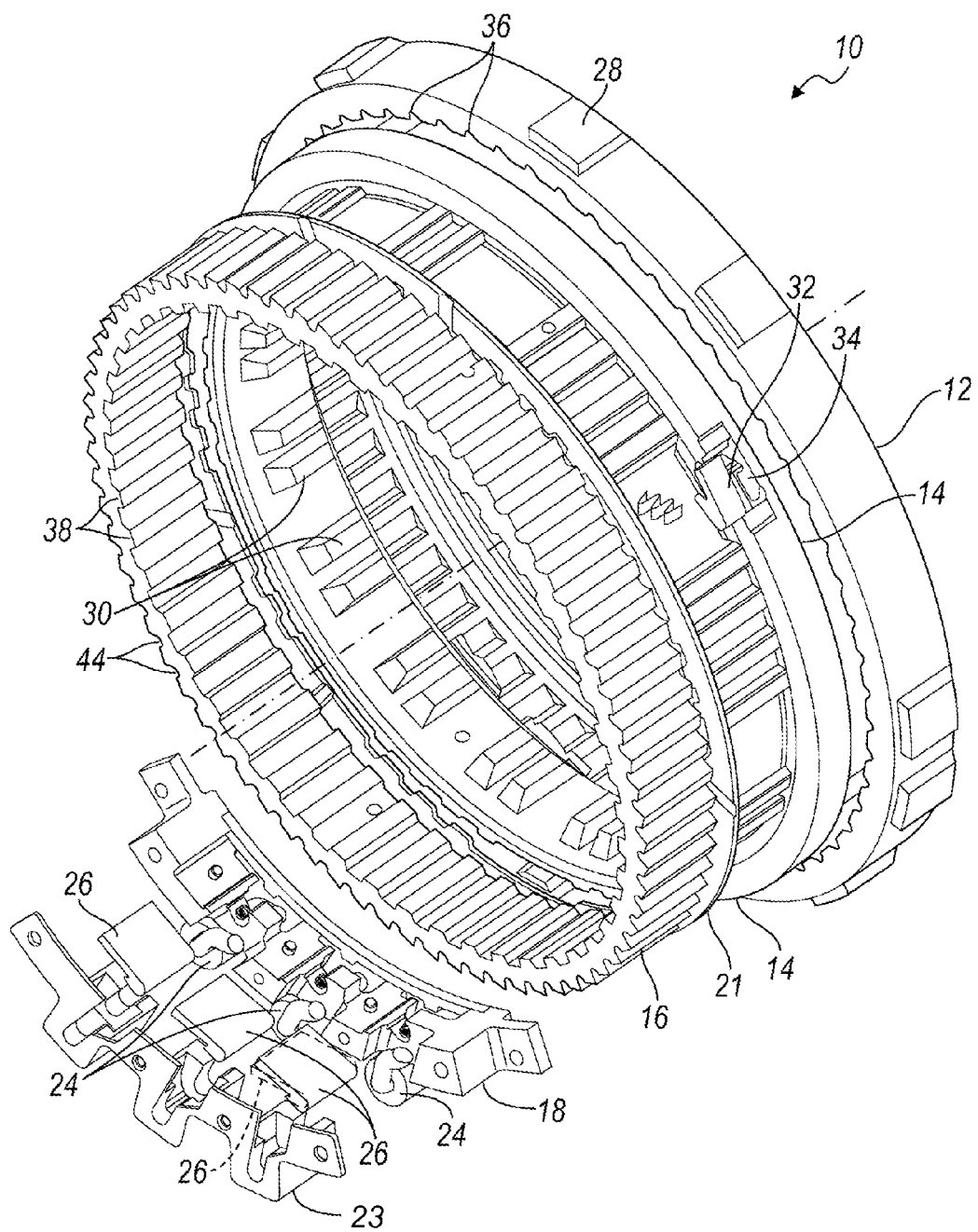
FIG. 2 is side perspective view of the selective OWC of FIG. 1.
Figure 3:
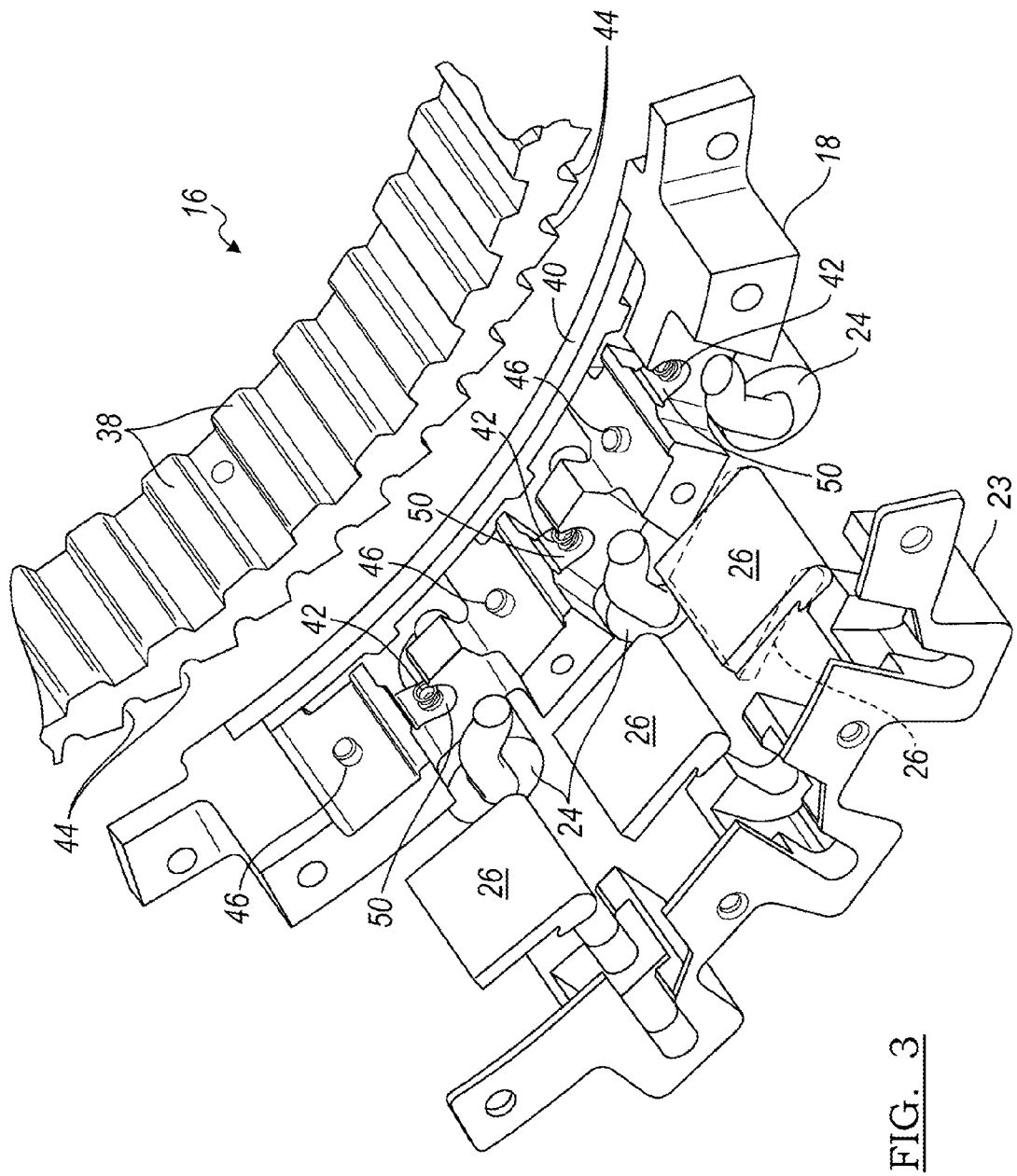
FIG. 3 is a perspective view of the electromagnets, second struts and second pocket plate of the selective OWC of FIG. 1.

The selectable OWB 10 shown in FIGS. 1, 2 and 3 includes a radial outer, first cam plate 12; a first pocket plate 14; a radial inner, second cam plate 16; and a radial inner, second pocket plate 18. A lead frame 20 is removed to show three coils 24 of electromagnets and three second struts 26. Plates 12, 14, 16, 18 are aligned with an axis 22.

The radial outer surface of first cam plate 12 is formed with spline teeth 28, by which cam plate 12 is secured against rotation to a stationary component of a transmission assembly, preferably to a transmission case. Similarly, the radial inner surface of first pocket plate 14 is formed with spline teeth 30, by which pocket plate 14 is secured to a reaction carrier of a transmission gearset. The carrier transmits torque to the OWB 10, causing the first pocket plate 14-second cam plate 16 subassembly to rotate.

First pocket plate 14 supports struts 32, each strut being urged by a respective spring 34 to pivot radially outward into engagement with one of the cams 36 on first cam plate 12, thereby driveably connecting first pocket plate 14 and first cam plate 12 and holding cam plate 12 against rotation. A retainer plate 21, located between an axial surface of pocket plate 14 and an axial surface of the second cam plate 16, prevents interference with the struts 32.

Centrifugal force produced on each of the struts 32 overcomes the force of the respective spring 34, which pivots the strut toward the cams 36. At high speed, each strut 32 pivots away from the cams 36, reducing the duty cycle on the spring. The first cam plate 12 must be a complete circle because the first pocket plate 14 can stop rotating at any angular position.

The first cam plate 12, first pocket plate 14 and struts 32 comprise a first drive coupling, in this case a one-way brake, which locks or engages when the first pocket plate rotates clockwise (when viewed as shown in FIG. 1) relative to the first cam plate, and overruns when the first pocket plate rotates counterclockwise (when viewed as shown in FIG. 1) relative to the first cam plate.

The inner surface of the second cam plate 16 is formed with internal spline teeth 38, which mesh with external spline teeth 39 on the outer surface of the first pocket plate 14.

The second pocket plate 18 is bolted to the first cam plate 12, which is fixed against rotation. A retainer plate 40 and a member 23 connect the opposite ends of the second pocket plate 18. Each of the second struts 26 is pivotably supported on the second pocket plate 18. A spring 42, preferably a helical spring, at each pocket location urges the respective strut 26 to pivot radially outward away from the cams 44 on the second cam plate 16, thereby opening a drive connection between the second cam plate 16 and the second pocket plate 18.

The second cam plate 16, second pocket plate 18 and struts 26 comprise a second drive coupling, also a one-way brake, which locks or engages when the first pocket plate 14 rotates counterclockwise (when viewed as shown in FIG. 1) relative to the first cam plate and electric current is supplied to coils 24, and overruns when the first pocket plate rotates clockwise (when viewed as shown in FIG. 1) relative to the first pocket plate 14.

In operation, when electric current is supplied to each coil 24 of the electromagnets, the magnetic field carried through the respective strut 26 causes the strut to pivot radially inward toward the cams 44, thereby closing a drive connection between the second cam plate 16 and the second pocket plate 18. When at least one of the struts 26 engages one of the cams 44, the second cam plate is fixed against rotation through struts 26, second pocket plate 18 and first cam plate 12.

When the coils are deenergized and the springs 42 pivot the second struts 26 out of engagement with cams 44, each second strut contacts a standoff or stop 46, supported on a radial surface of the second pocket plate 18. Preferable the stop is of a plastic or another material having relatively low magnetic permeability.

Because the coils 24 that produce electromagnets are supplied with electric current, they must be in the second pocket plate 18, which is a static race. Because magnetic flux forces struts 26 into engagement with the second pocket plate 18, i.e., the static race, unbalance is not an issue and pocket plate 18 may have a shape that is other than a full circle.

Figure 4:
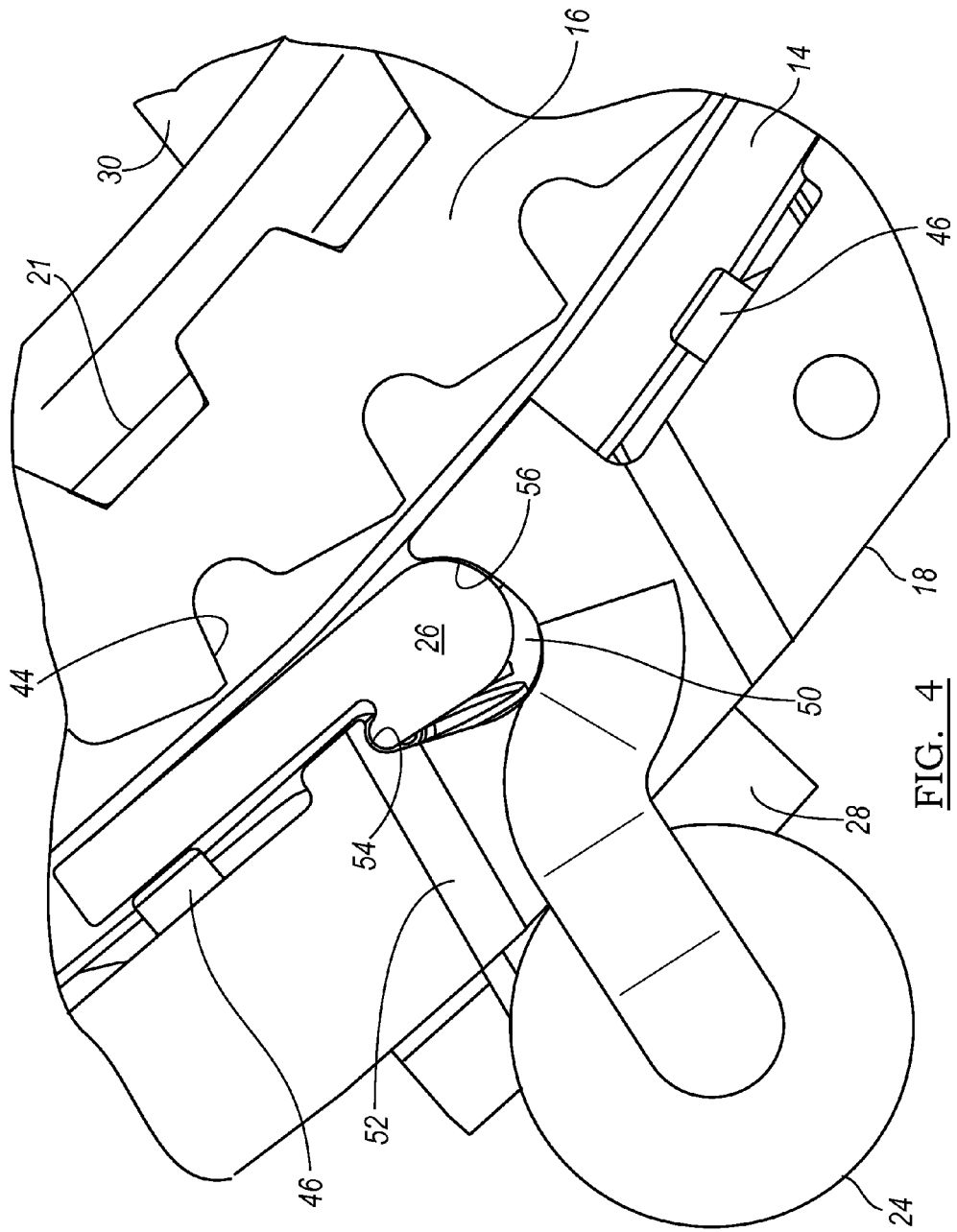
FIG. 4 is a side showing the second struts and coils assembled in the second pocket plate.

FIG. 4 shows one of the second struts 26 located in a pocket 50 formed in the second pocket plate 18, the strut being disengaged from the cams 44 of the second cam plate 16 and contacting stop 46 due to the effects of gravity and the force Fs produced by spring 42. Each spring 42 is located in a cylindrical recess 52 formed in plate 18.

Each pocket 50 is formed with concave cylindrical surface 54, on which a complementary convex surface of strut 26 pivots. Each pocket 50 is also formed with concave cylindrical surface 56, which guides movement of the strut 26 and limits its radial movement.

When electric current is supplied to coil 24, a magnetic field is produced such that its lines of magnetic flux or magnetic induction pass between the opposite poles and along the axial width of strut 26 due to its high magnetic permeability. The magnetic field produces distributed force Fm on the strut 26 and magnetically induces a moment on the strut, which causes the strut to pivot clockwise on surface 54 and into engagement with the cams 44 of the second cam plate 16. FIG. 1 shows one of the struts 26 engaged with one of the cams 44 and two struts disengaged from the cams 44 and contacting stops 46.

Surface 54 applies force Fg to the strut 26 at the pivot, and surface 56 applies force Fp to the strut.

A transmission controller opens and closes a connection between a source of electric current and the coils 24. Because centrifugal force is not used to pivot the struts 26 into engagement with second cam plate Second pocket plate 18 extends along a circular arc that is less than 360 degrees. Radial lines drawn from axis 22 to the angular extremities of second pocket plate 18 form an included angle A, whose magnitude is about 75 degrees. The second pocket plate 18 is large enough to contain the necessary number of struts 26, thereby reducing the cost and weight of the raceway and minimizing space required in the transmission.

In accordance with the provisions of the patent statutes, the preferred embodiment has been described. However, it should be noted that the alternate embodiments can be practiced otherwise than as specifically illustrated and described.

The invention claimed is:

1. A coupling device, comprising:
a first one-way coupling including a cam plate, a pocket plate and struts;
a second one-way coupling including a second cam plate rotatably fixed to the pocket plate, a second pocket plate extending in a partial circular arc and fixed to the cam plate, and second struts for selectively rotationally fixing said second plates together;
electromagnets for causing the second struts to rotationally fix the second plates together.

2. The coupling device of claim 1, wherein the second pocket plate extends angularly along the circular arc, such that an included angle between radial lines drawn from a central axis to angular extremities of the second pocket plate has a magnitude of about 75 degrees.

3. The coupling device of claim 1, wherein the struts of the first one-way coupling alternately open and close a drive connection between the cam plate and the pocket plate.

4. The coupling device of claim 1, wherein the cam plate includes spline teeth for securing the cam plate to a stationary component, thereby fixing the cam plate and the second pocket plate against rotation.

5. The coupling device of claim 1, wherein the cam plate, pocket plate and second cam plate extend angularly along the respective, complete circular arcs.

6. The coupling device of claim 1, further comprising:
cams formed on the second cam plate;
concave surfaces formed on the second pocket plate:
a convex surface formed on each of the second struts and engageable with one of the concave surfaces;
springs, each spring located on the second pocket plate for urging one of the second struts away from engagement with the cams;
coils, each coil able to produce an electromagnetic field for urging one of the second struts toward engagement with the cams.

7. The coupling device of claim 1, wherein the second pocket plate includes:
springs, each spring located on the second pocket plate for urging one of the second struts away from engagement with cams on the second cam plate;
coils, each coil able to produce an electromagnetic field for urging one of the second struts toward engagement with the cams.

8. The coupling device of claim 1, wherein:
the pocket plate includes internal spline teeth;
the second cam plate includes external spline teeth, engageable with the internal spline teeth for producing the rotationally fixed connection between the pocket plate and the second cam plate.

9. A one-way brake, comprising:
a first one-way coupling including a cam plate secured against rotation, a pocket plate and struts;
a second one-way coupling including a second cam plate driveably connected to the pocket plate, a second pocket plate extending in a circular arc less than 360 degrees and secured to the cam plate, and second struts for opening and closing a drive connection between said second plates;
electromagnets for causing the second struts to close said drive connection;
cams formed on the second cam plate;
concave surfaces formed on the second pocket plate;
a convex surface formed on each of the second struts and engageable with one of the concave surfaces;
springs, each spring located on the second pocket plate for urging one of the second struts away from engagement with the cams;
coils, each coil able to produce an electromagnetic field for urging one of the second struts toward engagement with the cams.

10. The one-way brake of claim 9, wherein the second pocket plate extends angularly along the circular arc, such that an included angle between radial lines drawn from a central axis to angular extremities of the second pocket plate has a magnitude of about 75 degrees.

11. The one-way brake of claim 9, wherein the struts of the first one-way coupling alternately open and close a drive connection between the cam plate and the pocket plate.

12. The one-way brake of claim 9, wherein:
the pocket plate includes internal spline teeth;
the second cam plate includes external spline teeth, engageable with the internal spline teeth for producing a continuous drive connection between the pocket plate and the second cam plate.

13. A coupling device, comprising:
a first one-way coupling including a cam plate, a pocket plate and struts;
a second one-way coupling including a second cam plate driveably connected to the pocket plate, a second pocket plate extending in a partial circular arc and secured to the cam plate, and second struts for opening and closing a drive connection between said second plates;
electromagnets for causing the second struts to close said drive connection; and
wherein: the pocket plate includes internal spline teeth; and the second cam plate includes external spline teeth, engageable with the internal spline teeth for producing a continuous drive connection between the pocket plate and the second cam plate.

14. The coupling device of claim 13, wherein the struts of the first one-way coupling alternately open and close a drive connection between the cam plate and the pocket plate.

15. The coupling device of claim 13, wherein the cam plate includes spline teeth for securing the cam plate to a stationary component, thereby fixing the cam plate and the second pocket plate against rotation.

16. The coupling device of claim 13, wherein the cam plate, pocket plate and second cam plate extend angularly along the respective, complete circular arcs.

17. The coupling device of claim 13, wherein the second pocket plate includes:
springs, each spring located on the second pocket plate for urging one of the second struts away from engagement with cams on the second cam plate;
coils, each coil able to produce an electromagnetic field for urging one of the second struts toward engagement with the cams.

\* \* \* \* \*